(12) United States Patent
Beaudin (10) Patent No.: US 7,103,118 B2
(45) Date of Patent: Sep. 5, 2006

(54) VECTORIAL COMBINER FOR DIVERSITY RECEPTION IN RF TRANCEIVERS

(75) Inventor: André Beaudin, Boucherville (CA)

(73) Assignee: Dataradio Inc., Mount Royal (CA)

( * ) Notice: Subject to any disclaimer, the term of this patent is extended or adjusted under 35 U.S.C. 154(b) by 850 days.

(21) Appl. No.: 09/994,267

(22) Filed: Nov. 26, 2001

(65) Prior Publication Data

US 2003/0099315 A1    May 29, 2003

(51) Int. Cl.
*H04L 1/02* (2006.01)
*H04B 1/10* (2006.01)

(52) U.S. Cl. .................... 375/347; 375/349; 455/137; 455/273

(58) Field of Classification Search ............... 375/267, 375/346, 347, 349; 455/132–138, 272, 273
See application file for complete search history.

(56) References Cited

U.S. PATENT DOCUMENTS

| | | | |
|---|---|---|---|
| 4,675,882 A * | 6/1987 | Lillie et al. ................. 375/324 |
| 5,465,271 A | 11/1995 | Hladik et al. | |
| 5,633,889 A | 5/1997 | Schilling | |
| 5,757,866 A | 5/1998 | Kannar et al. | |
| 5,889,826 A | 3/1999 | Takahashi | |
| 6,115,409 A * | 9/2000 | Upadhyay et al. ......... 375/144 |
| 6,161,001 A * | 12/2000 | Iinuma ....................... 455/137 |
| 6,181,199 B1 | 1/2001 | Camp, Jr. et al. | |
| 6,243,415 B1 | 6/2001 | Pipon et al. | |

FOREIGN PATENT DOCUMENTS

EP    0 632 604 A1    1/1995

OTHER PUBLICATIONS

DJEN, Wing S. *Application Note: AN1892 SA900 I/Q Transmit Modulator for IgHz applications*, Aug. 20, 1997, RF Communications Products, Philips Semiconductors.

* cited by examiner

*Primary Examiner*—Jay K. Patel
*Assistant Examiner*—David B. Lugo
(74) *Attorney, Agent, or Firm*—Workman Nydegger (57) ABSTRACT

A combiner for use in a diversity radio receiver (FM) which receives a plurality of diversity I and Q modulated signals each carrying I and Q information signals through spatially separated antennas, the received I and Q signal pairs being digitized at a sampling rate T and converted to baseband I and Q signals. Each converted I and Q signal pair represents a diversity I and Q vector which is input to the combiner. A discriminator is provided for each sample stream of diversity I and Q vectors input to the combiner. Each discriminator produces, for each sample, an output discriminated I and Q vector ($I_A$, $Q_A$) having a phase representative of the frequency of the information signal and an amplitude proportional to the power of the information signal. Adders separately add together the discriminated I signals ($I_A$) to produce a combined discriminated I signal ($I_{cA}$) and the discriminated Q signals ($Q_A$) to produce a combined discriminated Q signal ($Q_{cA}$), whereby the combined discriminated I and Q signals represent a combined discriminated vector ($I_{cA}$, $Q_{cA}$) having a phase determined by one or more of the phases of said diversity I and Q vectors depending upon the relative powers of said diversity I and Q vectors. A phase accumulator adds to an accumulation vector, over successive samples, the phases of the combined discriminated vectors ($I_{cA}$, $Q_{cA}$) to produce an output combined I and Q signal pair ($I_c$, $Q_c$).

19 Claims, 5 Drawing Sheets

VECTORIAL COMBINER FOR DIVERSITY RECEPTION IN RF TRANCEIVERS

FIELD OF THE INVENTION

This invention relates to signal processing and combining means for diversity wireless communications (radio) receivers for I and Q modulated signals.

BACKGROUND OF THE INVENTION

Many wireless communications networks, such as public GSM (Global System for Mobile Communications) networks and private land mobile radio networks, use frequency modulation which has proven to be well suited to the mobile environment by reason of immunity to impulse noise which is common in such environments. However, these types of networks differ from those used for fixed microwave point-to-point communications services and satellite systems because the signals transported through these networks are subject to a greater degree of interference and distortion due to reflections and fading of the signals.

Signals arriving at or from a wireless communications device such as a mobile radio receiver or cellular telephone are almost always comprised of a complex amalgam of waves, some directly from the sending antenna and others reflected from stationary and moving objects. In the worst case scenario, the total received signal is composed of reflected signals. The resulting waveform caused by the combination of reflected signals (worse case) and/or direct signal plus reflected signals, is subject to cancellation or reinforcement in the amplitude domain as well as distortion in the time domain resulting from propagation delays over the varying length paths taken by reflected signals. Both the amplitude and time distortions make decoding of the signals more difficult. It is not uncommon for cancellation to reduce the incoming signal to a level far below the threshold required for reliable decoding by the receiver. This effect is referred to as multi-path fading.

In data systems, such cancellations or "drop outs" erase portions of the desired bit stream. The duration of the erasure is a function of the average signal strength, the wavelength of the radio signal, the speed of the vehicle (where the wireless device is being operated in a vehicle) and that of moving reflectors in the vicinity. Forward Error Correction (FEC) is a common technique for solving this erasure problem. Redundant information is added to the transmitted data to allow for a predicted level of erasures and recovery of the original data without re-transmission. FEC is useful but as the bit rate increases, more and more redundancy must be added which leads to diminishing returns. The redundancy reduces the effective bit rate of the system.

Another solution to problems caused by multi-path fading is to increase the complexity of the receiving system. Fading can be mitigated by receiving diversity signals such as by using multiple receivers. For a spatial diversity system multiple spaced-apart antennas are used and for an orthogonal diversity system a multiply polarized antenna is used. Other known diversity systems use frequency or time diversity. All such systems take advantage of diversity between two received signals, where each received signal carries the same transmitted information. A determination is made as to which signal is stronger and then the stronger signal is used, rather than the weaker one, to extract the information and thereby reduce the negative effects of fading. Most common are spatial diversity receivers comprising two or more receivers with separate antennas spaced an appropriate distance apart from each other so that the received signals are non-correlated give rise to probabilities that destructive interference experienced at one antenna may not be present on another.

Diversity receiving systems generally use one of three different classes of techniques to combine the multiple signals, being: (i) selection combining whereby the best signal is chosen based on assessment of signal strength (i.e. the signal having the best signal-to-noise ratio); (ii) equal gain combining whereby all signals are combined together regardless of the strength of any individual signal; and (iii) optimal combining whereby the signals are combined proportionally based on their individual strengths. Only the latter attempts to make use of the maximum possible information content available from all signals to yield optimal performance. However, in practice, it has been difficult to design combiner circuitry which effectively combines signals on such an optimal basis, the problem being to develop effective and practical algorithms for determining the weights to be applied. Many known optimal combiners use complex equalizers to implement an estimation of the received symbol sequences which is then used to proportionally weight the received signals for combining purposes. A further difficulty is posed by a need to develop means to align the diversity signals in such manner that they do not cancel (i.e. if one tries to directly add signals' orthogonal components, $I_1$ to $I_2$ and $Q_1$ to $Q_2$, this will result in cancellations akin to fading).

Accordingly, there is a need for an effective means of optimally combining signals in a diversity receiver which is less complex than those of the prior art and is able to avoid cancellations. Further, there is a need for such combining means which has a relatively low power consumption and may be implemented at relatively low cost.

SUMMARY OF THE INVENTION

In accordance with the invention there is provided a combiner for efficiently combining a plurality of diversity I and Q modulated signals (e.g. FM), each carrying I and Q information signals, on the basis of the relative strengths of the diversity signals. Prior to combining the I and Q signal pairs are digitized at a sampling rate T and converted to baseband I and Q signals wherein each converted I and Q signal pair represents a diversity I and Q vector for input to the combiner.

For each sample stream of the plurality of diversity I and Q vectors input to the combiner a discriminator is provided. Each discriminator, being a complex discriminator, is configured for producing, for each sample, an output discriminated I and Q vector ($I_A$, $Q_A$) having a phase representative of the frequency of the information signal and an amplitude proportional to the power of the information signal. A first adder is provided to produce a combined discriminated I signal ($I_{cA}$), the first adder being configured for adding together, for each set of sampled diversity vectors, the discriminated I signals ($I_A$). A second adder is provided to produce a combined discriminated Q signal ($Q_{cA}$), the second adder being configured for adding together, for each sample of the diversity vectors, the discriminated Q signals ($Q_A$). The resulting combined discriminated I and Q signals represent a combined discriminated vector ($I_{cA}$, $Q_{cA}$) having a phase which is determined by one or more of the phases of the diversity I and Q vectors depending upon the relative powers of the diversity I and Q vectors. A phase accumulator is configured for adding to an accumulation vector, over successive samples, the phases of the combined discriminated vectors ($I_{cA}$, $Q_{cA}$) to produce an output combined I and Q signal pair ($I_c$, $Q_c$)

Preferably, the complex discriminator is configured to perform the calculations $I_A(t)=I(t)I(t-T)+Q(t)Q(t-T)$ and $Q_{66}(t)=I(t-T)Q(t)-I(t)Q(t-T)$ and the phase accumulator is configured to perform the calculations $I_c(t)=I_{cA}(t)I_c(t-T)-Q_{cA}(t)Q_c(t-T)$ and $Q_c(t)=I_{cA}(t)Q_c(t-T)+I_c(t-T)Q_{cA}(t)$. The phase accumulator preferably comprises a normalizer component configured for producing a normalizing signal for normalizing the accumulation vector ($I_c(t-T),Q_c(t-T)$) following each the successive accumulation. The magnitude of the normalizing signal may be substantially equal to $1/\sqrt{(I_c^2+Q_c^2)}$. In another embodiment, the magnitude of the normalizing signal approximates $1/\sqrt{(I_c^2+Q_c^2)}$ whereby the normalizer component comprises a bit register which receives the value of $I_c^2+Q_c^2$ following each the successive accumulation and logic gates configured for determining a number "n" of bit shifts applied to $I_c(t-T)$ and $Q_c(t-T)$ to produce a normalized vector whose magnitude is between 0.5 and 1.0.

An alternative phase accumulator may be configured for deriving the arctangent of the vector $I_c(t-T)+jQ_c(t-T)$, adding the derived angle to the accumulation phase (modulo $2\pi$) and applying a cosine and a sine function to the resulting angle to produce the combined I and Q signal pair ($I_c$, $Q_c$)

In accordance with a further aspect of the invention there is provided a method for combining a plurality of diversity baseband I and Q modulated signals each carrying an I and Q information signal. For each sample stream of the plurality of diversity I and Q vectors, each sample is discriminated to produce a discriminated I and Q vector ($I_A$, $Q_A$) having a phase representative of the frequency of the information signal and an amplitude proportional to the power of the information signal. A combined discriminated I signal ($I_{cA}$) is produced by adding together, for each set of sampled diversity vectors, the discriminated I signals ($I_A$). A combined discriminated Q signal ($Q_{cA}$) is also produced by adding together, for each sample of the diversity vectors, the discriminated Q signals ($Q_A$). The combined discriminated I and Q signals represent a combined discriminated vector ($I_{cA}$, $Q_{cA}$) having a phase which is determined by one or more of the phases of the diversity I and Q vectors depending upon the relative powers of the diversity I and Q vectors. A combined I and Q signal pair ($I_c$, $Q_c$) is produced by adding the phases of the combined discriminated vectors ($I_{cA}$, $Q_{cA}$) over successive samples.

BRIEF DESCRIPTION OF THE DRAWINGS

Reference will now be made to the accompanying drawings which show, by way of example, a preferred embodiment of the present invention, and in which like reference numerals refer to like elements throughout.

DESCRIPTION OF A PREFERRED EMBODIMENT

The signal processing and combining steps performed by a preferred I & Q FM receiver embodiment in accordance with the invention are described below with reference to the appended drawings.

Figure 1:
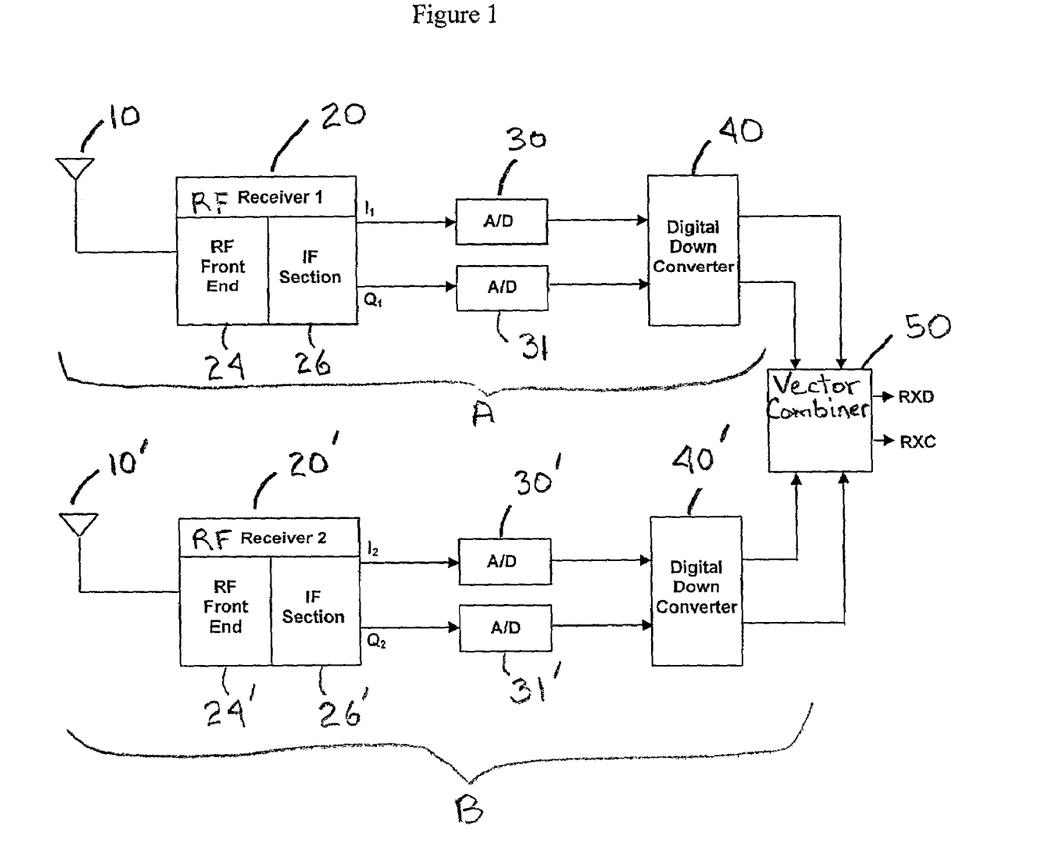
FIG. 1 is a top level block diagram of an RF receiver, the components of which include a vectorial diversity combiner (vector combiner) in accordance with the invention.

Referring to FIG. 1 the components designated as "A" and "B" represent two sets of receiver components which may be identical, each set being connected to a received diversity signal. In the illustrated embodiment each such received signal is received at one of two different spaced-apart antennas 10, 10' wherein the spacing between these antennas in an appropriate distance to provide suitable diversity signals. The signals generated by the two sets of receiving components are differentiated herein by designating them with the suffixes 1 and 2, respectively. The I and Q signals from receiver 1 are designated by the notation $I_1$ and $Q_1$, respectively, and the I and Q signals from the second receiver (receiver 2) are designated by the notation $I_2$ and $Q_2$, respectively. The combined signal pair produced by the combiner of the present invention is designated by the notation $I_c$ and $Q_c$ (i.e. ($I_c$, $Q_c$)) Where a signal pair has been discriminated the signals are designated by notation having a "$\Delta$" appended to the subscript. All signal pairs are sampled with a sampling period of T (which, as is known by persons skilled in the art, should preferably exceed the Nyquist rate) and consecutive samples are designated by the notation $I_2(t)$, $I_2(t-T)$, etc. and $Q_2(t)$, $Q_2(t-T)$, etc. A signal pair represents a vector in cartesian coordinates. It may also be represented in the polar form, as $(I_1,Q_1)=A_1 e^{j\theta}{}_1$, whereby the amplitude and phase, A and $\theta$, respectively, carry the same subscript as their corresponding cartesian values.

While a wireless communications (RF) receiver utilising two receiving components with spaced apart antennas is described herein, it will be understood by persons skilled in the art that similar principles to those described below may be applied to implement the invention in receivers employing three or more receiving components with associated received diversity signals. The terms "radio" and "wireless communications" are intended to have the same meaning, and are used interchangeably, herein; they are not intended to be limited to any particular frequency range.

Each set of receiver components comprises an antenna 10, 10' and an RF receiver 20, 20' which in turn comprises a radio frequency (RF) front end section 24, 24' and an intermediate frequency (IF) section 26, 26'. I and Q component modulation signals are output from each IF section and these are designated $I_1$ and $Q_1$ and $I_2$ and $Q_2$, respectively. These signals are then converted to digital signals by analog-to-digital (A/D) converters 30, 31, 30' and 31' and, thereafter, are converted to baseband (zero IF) by digital down converters 40, 40'. The baseband digital I and Q signals output from converters 40, 40' are input to a vector combiner 50 which recovers the digital information carried (modulated) by the RF signals. The received data (RXD) is output from the vector combiner 50 as well as a receive clock signal (RXC). The vector combiner 50 may implemented by means of a digital signal processor (DSP) or, alternatively, by an application specific integrated circuit (ASIC).

Figure 2:
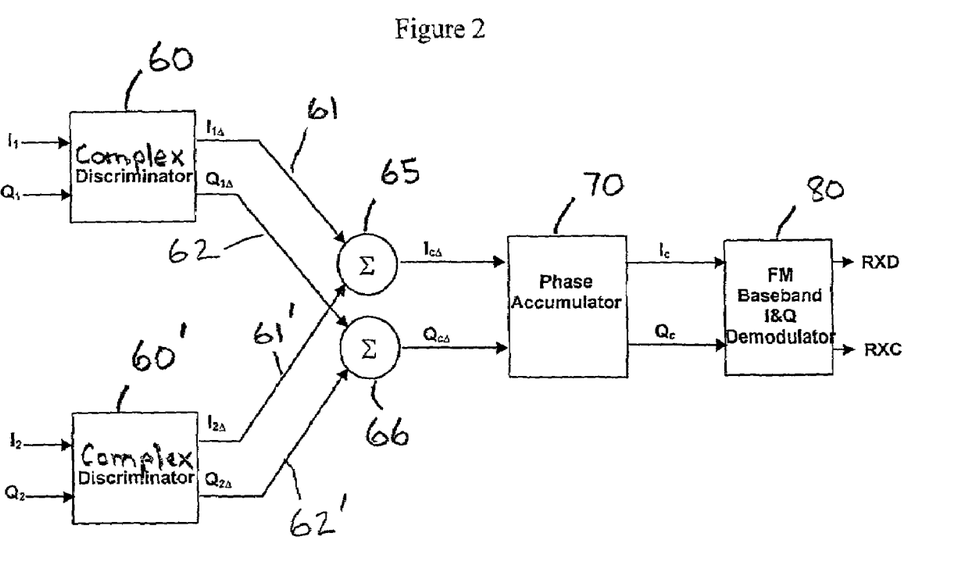
FIG. 2 is a schematic block diagram of components of the vector combiner shown in FIG. 1.

FIG. 2 illustrates the functional components of the vector combiner 50. Since the information conveyed is carried by the frequency and the spatial separation of the antennas 10, 10' (i.e. the diversity between the two signals) disallows the direct combination of the orthogonal components, each I and Q signal pair is processed by a complex discriminator 60, 60' which extracts the frequency information and produces a new signal pair (vector) $I_\Delta$, $Q_\Delta$ dependent of the absolute phase of the original signal pair I and Q. This method of discriminating the signal pair utilizes a property of the polar form of the vector (but, of course, the calculations to be applied could be transformed to cartesian form, instead, if desired). The complex discriminator 60, 60' squares a signal input to it and, consequently, the signal which is output by the complex discriminator is representative of the power of the input signal. The output power vectors 61, 61' and 62, 62' are then added by adders 65, 66 to form a combined vector $I_{c\Delta}$, $Q_{c\Delta}$. The combined vector $I_{c\Delta}$, $Q_{c\Delta}$ is processed by a phase accumulator 70 to convert the combined vector to a quadrature signal pair $I_c$ and $Q_c$ having the modulation angle of the received RF signals. The resulting signal pair $I_c$ and $Q_c$ is then demodulated by an FM baseband I and Q demodulator 80 to produce the desired received data signal (RXD).

The combined vector has a magnitude which is representative of the power of the signal pairs output from the complex discriminators 60, 60' and a phase which carries the frequency thereof and, therefore, the modulated information. The angle of the combined vector $I_{c\Delta}$, $Q_{c\Delta}$ is the result of the diversity combining according to which the relative strength of the input signal pairs (vectors) is the determinative factor. That is, if one input vector is much stronger than the other one, the angle of the stronger vector dominates that of the combined vector and if both input vectors have the same strength the angle of the combined vector is an average of the angles of the input vectors. Advantageously, the result of this combining is that the strongest of the two diversity input signals is used for processing where one of the signals is relatively weaker but where both signals have about the same strength an average of the two is used for processing.

Figure 3:
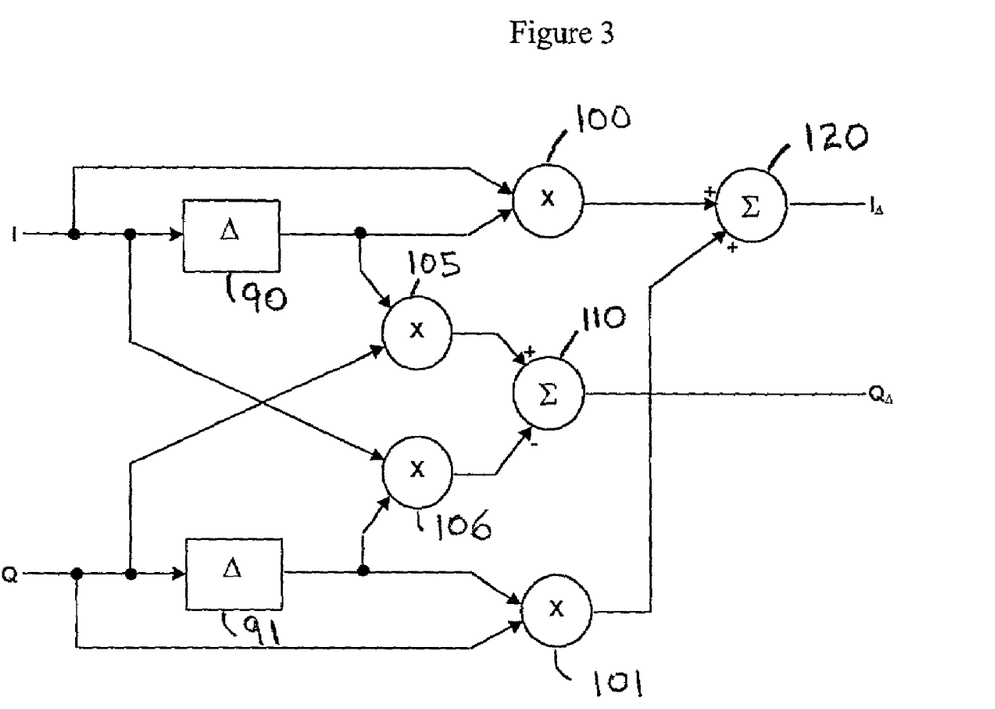
FIG. 3 is a schematic block diagram illustrating the functions performed by each complex discriminator component of the vector combiner.

A functional block diagram of each complex discriminator 60,60' is shown in FIG. 3. As shown, this component multiplies in the cartesian form the current vector with the conjugate of the vector delayed by one sample. Boxes 90, 91 in FIG. 3 (showing a "Δ" therein) represent one unit sample delay.

Referring to discriminator 60 of receiver 1, for example, the complex discrimination applied by this component takes advantage of the following property:

$$A_1(t)e^{j\theta_1(t)} \cdot A_1(t-T)e^{-j\theta_1(t-T)} = A_1(t)A_1(t-T)e^{j(\theta_1(t)-\theta_1(t-T))} \quad (1)$$

$$= A_1(t)A_1(t-T)e^{j(\Delta\theta_1(t))}$$

As indicated above, this equation (1) shows that multiplying a current sample of a vector with the conjugate of the previous sample vector yields a vector having an angle which represents the frequency and an amplitude which is proportional to the power. Equation (1) is equivalent to the cartesian form:

$$A_1(t)e^{j\theta_1(t)} \cdot A_1(t-T)e^{-j\theta_1(t-T)} = I_1(t)I_1(t-T)+Q_1(t)Q_1(t-T)+j(I_1(t-T)Q_1(t)-I_1(t)Q_1(t-T)) \quad (2)$$

Hence, $$I_{1\Delta}(t)=I_1(t)I_1(t-T)+Q_1(t)Q_1(t-T) \quad (3)$$

$$Q_{1\Delta}(t)=I_1(t-T)Q_1(t)-I_1(t)Q_1(t-T) \quad (4)$$

The calculations of equations (3) and (4) are performed by each complex discriminator 60, 60' as shown by FIG. 3 in which blocks 90, 91 represent a sample delay, multipliers 100, 101, 105, 106 perform the multiplication steps and adders 110, 120 perform the summation steps. When the complex discriminators are implemented by a DSP each complex discriminator determines a vector carrying the power and the frequency of a received information signal in roughly four multiply-accumulate steps (i.e. four one-cycle instructions of the DSP subject to the possibility that, depending on the specific processor implementation used, some extra instructions may be required to set-up the registers before the multiply-accumulates). When an ASIC implementation of the vectorial combining is used (i.e. using specifically designed hardware (gates) instead of a DSP) the discrimination is performed by the four multiplication and two addition steps shown by equations (3) and (4).

The outputs $I_{1\Delta}$ and $I_{2\Delta}$ of discriminators 60 and 60', respectively, are summed by adder 65 to produce a combined signal $I_{c\Delta}$. Similarly, the outputs $Q_{1\Delta}$ and $Q_{2\Delta}$ of discriminators 60 and 61, respectively, are summed by adder 66 to produce a combined signal $Q_{c\Delta}$. The angle of the combined vector $I_{c\Delta}$, $Q_{c\Delta}$ output from adders 65,66 is close to the angle of the strongest received signal unless both received signals have comparable power levels, in which case the combined vector has an angle close to the average of the angle of each received signal. If the power of one received signal is negligible relative to that of the other received signal, the angle of the combined vector is almost the same as the strong signal's angle. It is to be noted that because the vectors' magnitudes are proportional to the power of the corresponding signal, the comparison is done in terms of power and this is adequate for combining the signals in an efficient manner.

The combined vector $I_{c\Delta}$, $Q_{c\Delta}$ is input to a phase accumulator 70 which performs the reverse function of the discriminators 60, 60'. Specifically, in the accumulator 70 phases are added to an accumulator vector that rotates at a frequency representative of the frequency of the original received I and Q signals.

Figure 4:
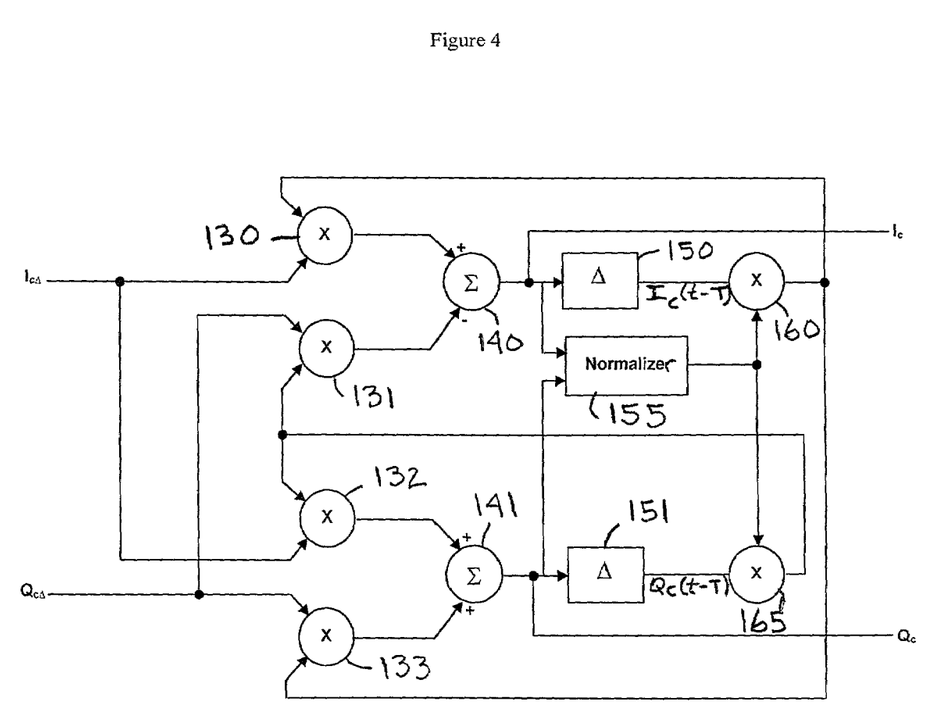
FIG. 4 is a schematic block diagram illustrating the functions performed by a phase accumulator component of the vector combiner; and, FIG. 5 is a schematic block diagram of the normalizer component of the phase accumulator shown in FIG. 4.

FIG. 4 shows a functional block diagram of the phase accumulator 70. This component multiplies in the cartesian form the input combined vector $I_{c\Delta}$ and $Q_{c\Delta}$ with a normalized accumulator vector. In operation, the phase accumulator has an initial value and this is added to at every sample time. The delay boxes 150 and 151 in FIG. 4 are memory elements that hold the current sample time's accumulator vector and, on each iteration, this accumulator vector is normalized and multiplied by the inputs $I_{c\Delta}$ and $Q_{c\Delta}$ to produce the output $I_c$ and $Q_c$. The output $I_c$ and $Q_c$ is then used as the accumulator for the next iteration. The following describes the basis by which the combined vector $I_{c\Delta}$, $Q_{c\Delta}$ is converted back to a quadrature signal pair conveying the combined angle of the modulation of the received RF signals.

The phase of each combined vector $I_{c\Delta}$, $Q_{c\Delta}$ is accumulated and the output phase is the phase of the product of the input vector and the accumulator vector. Due to the implicit modulo characteristic of a complex multiply the output phase must be between and $-\pi$ and $\pi$. The combined vector carrying the combined frequency information is multiplied with a normalized accumulation vector, as follows:

$$A_c e^{j\Delta\theta c(t)} \cdot 1 e^{j\theta c(t-T)} = A_c e^{j(\theta c(t-T)+\Delta\theta c(t))} = A_c e^{j\theta c(t)} \quad (5)$$

Equation (5) translates in the cartesian notation to:

$$(I_{c\Delta}(t)+jQ_{c\Delta}(t)) \cdot (I_c(t-T)+jQ_c(t-T))=I_c(t)+jQ_c(t) \quad (6)$$

or, $$(I_c(t)=I_{c\Delta}(t)I_c(t-T)-Q_{c\Delta}(t)Q_c(t-T) \quad (7)$$

$$Q_c(t)=I_{cA}(t)Q_c(t-T)+I_c(t-T)Q_{cA}(t) \qquad (8)$$

These calculations are performed by the components of the phase accumulator 70 shown in FIG. 4 comprising multipliers 130, 131, 132, 133, adders 140, 141 and symbol delay units 150, 151. At each time equations (7) and (8) are applied by the accumulator 70, the resulting vector is normalized to unity length in order that the accumulator doesn't overflow after multiple multiplication.

The normalization is performed by a normalizer component 155, which produces the appropriate gain, and multipliers 160 and 165 as shown in FIG. 4. The optimal gain to be applied by the normalizer component 155 is $1/\text{sqrt}(I_c^2+Q_c^2)$ but an acceptable approximation of this is, in fact, more preferably applied in order to provide stability to the phase accumulator while maintaining an acceptable level of accuracy. In the preferred embodiment, this approximation is achieved by multiplying each of $I_c(t-T)$ and $Q_c(t-T)$ by $2^n$ where n is chosen so that the resulting normalized vector fed back to multipliers 130 and 133 has a magnitude between 0.5 and 1. For some applications it may be desirable to use a high sampling rate so that most of the amplitude noise added to the received signal by the normalization error will be out of band.

Figure 5:
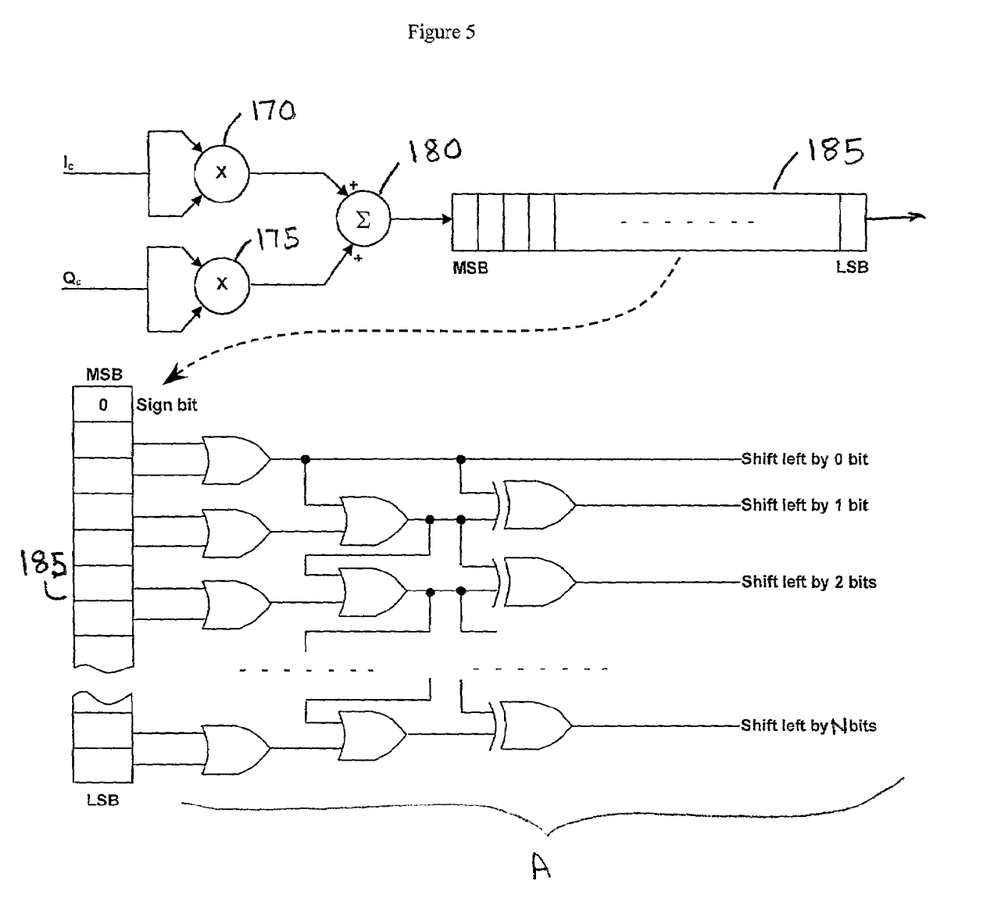

FIG. 5 illustrates an exemplary ASIC implementation of the normalizer component 155 which is used for a hardware implementation of the preferred embodiment disclosed herein. As will be readily understood by a person skilled in the art, for the DSP implementation of the preferred embodiment, the DSP is configured to perform the same functionality. The components of FIG. 5 determine the gain $2^n$ which is applied to $I_c(t-T)$ and $Q_c(t-T)$ by means of mulitpliers 160 and 165. To do so, the squares of the magnitudes of each of Ic and Qc is performed by multipliers 170, 175 and these squared values are added by adder 180 and the sum is input to a register 185. If, for example, Ic and Qc are 16-bit signed words, the register 185 comprises a 31-bit unsigned word having 30 significant bits. The gain required is $2^n$ and, therefore, a simple bit shift of the accumulation vector $I_c(t-T)$ and $Q_c(t-T)$, from least significant bit (LSB) to most significant bit (MSB), is performed. The number of bits to be shifted is determined by the bit location of the first pair of bits to the right of the MSB of register 185 that are not a pair of zeros. The particular means used in this implementation to determine the number of bits for shifting is shown by the set of logic gates "A" shown in FIG. 5 (but it will be appreciated by one skilled in the art that other effective means may instead be used). In operation, the leftmost column of "OR" gates create a vector indicating which bit pairs are non-zero and which are pairs of zeros. The second column of "OR" gates produces a vector comprised of zeros above the first non-zero pair and ones there below. For the column of "exclusive OR" gates each has a zero output except for the one which is aligned with the first non-zero pair of bits of the shift register 185. This non-zero output of the exclusive OR gates is used to select the shift number "n" being a number from "0" to "N", where N is the number of significant bits of the unsigned word held by register 185 divided by 2 (i.e. "N" is 15 in the foregoing example of a 31-bit unsigned word). A barrel shifter (i.e. being multipliers 160 and 165 in FIG. 4) is used to shift the bits of the accumulation vector $I_c(t-T)$ and $Q_c(t-T)$ by "n" bits (as is well known by persons skilled in the art).

Advantageously, the foregoing components and method of vectorially combining diverse received signals is essentially accomplished by performing only a relatively few, simple mathematical functions (viz. multiplication and addition) and, thus, the hardware needed to implement a receiver embodying this invention consumes a relatively low amount of power and is relatively less expensive to manufacture.

A somewhat more complex phase accumulator method which could be used for an alternative embodiment of the invention, instead of the foregoing more simple method, is the following. According to this method the phase of Ic,Qc is obtained by performing an arctangent and then this phase is added to a modulo $2\pi$ counter (scalar) at every sample time. The outputs Ic,Qc are generated by taking the sin and cos of the phase accumulator. More specifically, the four-quadrant arctangent of the vector $I_c(t-T)+jQ_c(t-T)$ is derived and the resulting angle is added to the accumulator using modulo $2\pi$ arithmetic (it is to be noted that the accumulator in this case is scalar unlike the complex accumulator of FIG. 4). After each accumulation, a cosine and a sine function are applied to the resulting angle to produce the output $I_c$ and $Q_c$ signal pair.

Although the foregoing preferred embodiment utilizes spatial diversity received signals it is to be understood that the invention claimed herein is not intended to be limited to such form of diversity and, instead, extends to other forms of diversity signals which might be utilized in an alternative embodiment. Moreover, it is to be understood that the claimed invention is not limited to any particular number of diversity received signals and receiver component sets; whatever the number used, vectors output from that number of discriminators are added and the summation is input to a phase accumulator. The use of two such received signals and receiver component sets in the described embodiment is exemplary only.

The vectorial combining algorithms of the invention are efficient and provide improvements over the processing functions performed by known receivers. It is to be understood that the specific steps of the algorithms described above are those presently preferred by the applicant but these may be varied within the scope of the appended claims with a view either to improving performance, simplifying implementation, or taking advantage of improved DSP, ASIC or other technology used to implement the digital circuits of the receiver. The individual circuit functions and processing functions utilised in the receiver are, individually, well understood by those skilled in the art, and although particular implementations of these functions may have been described, it should be understood that functionally equivalent or superior implementations may be substituted. Likewise, particular functions may be performed at different points in the receiver if functionally equivalent results are obtained.

What is claimed is:

1. A combiner for use in a diversity radio receiver which receives a plurality of diversity I and Q modulated signals each carrying I and Q information signals, wherein said received I and Q signal pairs are digitized at a sampling rate T and converted to baseband I and Q signals wherein each said converted I and Q signal pair represents a diversity I and Q vector for input to said combiner, said combiner comprising:

(a) for each sample stream of said plurality of diversity I and Q vectors input to said combiner, a discriminator configured for producing for each sample an output discriminated I and Q vector $(I_A, Q_A)$ having a phase representative of the frequency of said information signals and an amplitude proportional to the power of said information signals;

(b) adders configured for adding together, for each set of sampled diversity vectors, said discriminated I signals ($I_A$) to produce a combined discriminated I signal ($I_{cA}$) and for adding together, for each set of sampled diversity vectors, said discriminated Q signals ($Q_A$) to produce a combined discriminated Q signal ($Q_{cA}$), whereby said combined discriminated I and Q signals represent a combined discriminated vector ($I_{cA}$, $Q_{cA}$) having a phase which is determined by one or more of the phases of said diversity I and Q vectors depending upon the relative powers of said diversity I and Q vectors;

(c) a phase accumulator configured for adding to an accumulation vector, over successive samples, said phases of said combined discriminated vectors ($I_{cA}$, $Q_{cA}$) to produce an output combined I and Q signal pair ($I_c$, $Q_c$).

2. A combiner according to claim 1 wherein said discriminator is a complex discriminator.

3. A combiner according to claim 2 wherein said received diversity I and Q signals are FM signals.

4. A combiner according to claim 3 wherein said complex discriminator is configured to perform the calculations:

$$I_A(t) = I(t)I(t-T) + Q(t)Q(t-T); \text{ and,}$$

$$Q_A(t) = I(t-T)Q(t) - I(t)Q(t-T).$$

5. A combiner according to claim 4 wherein said phase accumulator is configured to perform the calculations:

$$I_c(t) = I_{cA}(t)I_c(t-T) - Q_{cA}(t)Q_c(t-T); \text{ and,}$$

$$Q_c(t) = I_{cA}(t)Q_c(t-T) + I_c(t-T)Q_{cA}(t).$$

6. A combiner according to claim 5 wherein said phase accumulator comprises a normalizer component configured for producing a normalizing signal for normalizing said accumulation vector ($I_c(t-T), Q_c(t-T)$) following each said successive accumulation.

7. A combiner according to claim 6 wherein the magnitude of said normalizing signal is substantially equal to $1/\text{sqrt}(I_c^2 + Q_c^2)$.

8. A combiner according to claim 6 wherein the magnitude of said normalizing signal approximates $1/\text{sqrt}(I_c^2 + Q_c^2)$, said normalizer component comprising a bit register which receives the value of $I_c^2 + Q_c^2$ following each said successive accumulation and logic gates configured for determining a number "n" of bit shifts to be applied to $I_c(t-T)$ and $Q_c(t-T)$ to produce a normalized vector whose magnitude is between 0.5 and 1.0.

9. A combiner according to claim 6 wherein said plurality of diversity signals comprise two diversity I and Q modulated signals.

10. A combiner according to claim 7 wherein said diversity signals are spatial diversity I and Q modulated signals.

11. A combiner according to claim 3 wherein said phase accumulator is configured for deriving the arctangent of the vector $I_c(t-T) + jQ_c(t-T)$, adding the derived angle to said accumulation vector's phase (modulo $2\pi$) and applying a cosine and a sine function to the resulting angle to produce said combined I and Q signal pair ($I_c$, $Q_c$).

12. A method for combining a plurality of diversity baseband I and Q modulated signals each carrying an I and Q information signal, said modulated signals having been digitized at a sampling rate T and each I and Q signal pair representing a diversity I and Q vector, said method comprising the steps:

(a) for each sample stream of said plurality of diversity I and Q vectors, discriminating each sample to produce a discriminated I and Q vector ($I_A$, $Q_A$) having a phase representative of the frequency of said information signal and an amplitude proportional to the power of said information signal;

(b) producing a combined discriminated I signal ($I_{cA}$) by adding together, for each set of sampled diversity vectors, said discriminated I signals ($I_A$) and producing a combined discriminated Q signal ($Q_{cA}$) by adding together, for each set of sampled diversity vectors, said discriminated Q signals ($Q_A$), whereby said combined discriminated I and Q signals represent a combined discriminated vector ($I_{cA}$, $Q_{cA}$) having a phase which is determined by one or more of the phases of said diversity I and Q vectors depending upon the relative powers of said diversity I and Q vectors;

(c) producing a combined I and Q signal pair ($I_{cA}$, $Q_{cA}$) by adding said phases of said combined discriminated vectors ($I_{cA}$, $Q_{cA}$) over successive samples.

13. A method according to claim 12 whereby said discriminating step performs complex discrimination.

14. A method according to claim 13 whereby said diversity I and Q signals are FM signals.

15. A method according to claim 14 whereby said complex discrimination achieves the calculations:

$$I_A(t) = I(t)I(t-T) + Q(t)Q(t-T); \text{ and,}$$

$$Q_A(t) = I(t-T)Q(t) - I(t)Q(t-T).$$

16. A method according to claim 15 whereby said adding of said phases of said combined discriminated vectors ($I_{cA}$, $Q_{cA}$) achieves the calculations:

$$I_c(t) = I_{cA}(t)I_c(t-T) - Q_{cA}(t)Q_c(t-T); \text{ and,}$$

$$Q_c(t) = I_{cA}(t)Q_c(t-T) + I_c(t-T)Q_{cA}(t).$$

17. A method according to claim 16 whereby an accumulation vector ($I_c(t-T), Q_c(t-T)$) is normalized following each successive addition.

18. A method according to claim 17 whereby said normalization comprises multiplying said accumulation vector by an amount substantially equal to $1/\text{sqrt}(I_c^2 + Q_c^2)$.

19. A method according to claim 17 whereby said normalization comprises multiplying said accumulation vector by $2^n$, whereby the value of "n" is determined such that the magnitude of said normalized vector is between 0.5 and 1.0.

* * * * *

UNITED STATES PATENT AND TRADEMARK OFFICE
CERTIFICATE OF CORRECTION

PATENT NO. : 7,103,118 B2  
APPLICATION NO. : 09/994267  
DATED : September 5, 2006  
INVENTOR(S) : André Beaudin Page 1 of 1

It is certified that error appears in the above-identified patent and that said Letters Patent is hereby corrected as shown below:

Column 3, line 6, at the beginning of the line, delete "$Q_{66}$" and insert -- $Q_\Delta$ --.

Column 6, line 67, at the beginning of the equation, delete "*($I_c(t)$)*" and insert -- *$I_c(t)$* --.

Signed and Sealed this

Twenty-sixth Day of June, 2007

JON W. DUDAS  
*Director of the United States Patent and Trademark Office*